US011604592B2

(12) United States Patent
Muthiah et al.

(10) Patent No.: US 11,604,592 B2
(45) Date of Patent: Mar. 14, 2023

(54) DATA MANAGEMENT FOR EFFICIENT LOW POWER MODE HANDLING IN A STORAGE DEVICE

(71) Applicant: Western Digital Technologies, Inc., San Jose, CA (US)

(72) Inventors: Ramanathan Muthiah, Bangalore (IN); Lakshmi Sowjanya Sunkavelli, Bangalore (IN); Stella Achtenberg, Netanya (IL)

(73) Assignee: Western Digital Technologies, Inc., San Jose, CA (US)

( * ) Notice: Subject to any disclaimer, the term of this patent is extended or adjusted under 35 U.S.C. 154(b) by 5 days.

(21) Appl. No.: 17/339,547

(22) Filed: Jun. 4, 2021

(65) Prior Publication Data

US 2022/0391090 A1    Dec. 8, 2022

(51) Int. Cl.
*G06F 3/06*    (2006.01)
*G06N 5/022*    (2023.01)

(52) U.S. Cl.
CPC .......... *G06F 3/064* (2013.01); *G06F 3/0625* (2013.01); *G06F 3/0659* (2013.01); *G06F 3/0679* (2013.01); *G06N 5/022* (2013.01)

(58) Field of Classification Search
None
See application file for complete search history.

(56) References Cited

U.S. PATENT DOCUMENTS

| | | | | |
|---|---|---|---|---|
| 7,747,886 B1* | 6/2010 | Bridgwater | ........... | G06F 1/3203 713/323 |
| 8,468,375 B2* | 6/2013 | Mori | ............... | G06F 3/0674 713/320 |
| 2004/0111558 A1* | 6/2004 | Kistler | ............... | G06F 3/0689 711/114 |
| 2008/0155287 A1* | 6/2008 | Sundaram | ............ | G11C 16/30 710/14 |

(Continued)

FOREIGN PATENT DOCUMENTS

CN    103389948 A    * 11/2013    ........... G06F 1/3225

OTHER PUBLICATIONS

Starblaze, Daniel.Sun, Low-Power Design of SSDs, Flash Memory Summit 2018, <https://www.flashmemorysummit.com/English/Collaterals/Proceedings/2018/20180807_SSDS-102-1_Sun.pdf>, 10 pages.

*Primary Examiner* — Kevin Verbrugge
(74) *Attorney, Agent, or Firm* — Patterson + Sheridan, LLP; Steven H. VerSteeg (57) ABSTRACT

A method and apparatus for identifying data that is to be accessible in a low power state of a data storage device, and store this data in a physical (or logical) block that will be accessible in a low power state of the data storage device. Low power accessible data may be identified by host metadata of the data, indicating access is needed in a low power state. In other embodiments, the data storage device may learn the power state in which data should be accessible. In these embodiments, a controller stores information regarding the power state of a namespace in which the data is (Continued)

stored as an indicator to make the data accessible in a low power state. Alternatively, the controller stores a previous power state in which the data was accessed as an indicator to make the data accessible in a low power state.

19 Claims, 8 Drawing Sheets

(56) References Cited

U.S. PATENT DOCUMENTS

| | | | | |
|---|---|---|---|---|
| 2008/0195875 | A1* | 8/2008 | Hobson | G06F 12/1408 713/320 |
| 2008/0272836 | A1* | 11/2008 | Smit | G06F 1/3259 327/544 |
| 2009/0265567 | A1* | 10/2009 | Nguyen | G06F 16/113 711/E12.001 |
| 2009/0300397 | A1* | 12/2009 | Nguyen | G06F 1/3225 711/E12.016 |
| 2010/0287397 | A1* | 11/2010 | Naor | G06F 3/065 711/E12.001 |
| 2010/0313044 | A1* | 12/2010 | Rajpal | G06F 1/3287 710/33 |
| 2013/0268732 | A1* | 10/2013 | Ramaraju | G06F 1/3225 711/E12.017 |
| 2014/0167840 | A1* | 6/2014 | Machnicki | G06F 1/3253 327/544 |
| 2014/0173307 | A1* | 6/2014 | Machnicki | G06F 1/3287 713/320 |
| 2017/0075609 | A1* | 3/2017 | Dunn | G06F 3/064 |
| 2018/0107417 | A1* | 4/2018 | Shechter | G06F 3/0619 |
| 2019/0034106 | A1* | 1/2019 | Shin | G06F 3/0679 |
| 2022/0100256 | A1* | 3/2022 | Kan | G06F 1/3268 |

\* cited by examiner

DATA MANAGEMENT FOR EFFICIENT LOW POWER MODE HANDLING IN A STORAGE DEVICE

BACKGROUND

Field

Embodiments of the present disclosure generally relate to power management of a data storage device, such as a solid state drive.

Description of the Related Art

With the addition of complementary metal-oxide-semiconductor (CMOS) chip bound array (CbA) architectures in memory devices, data stored on a memory die may be processed faster due to the closeness of data to the control circuitry. However, CbA memories have greater power, putting more emphasis on power management to achieve greater performance while mitigating the increased power needs.

Conventionally, in token based power management for an array of memory dies, all dies are transitioned to different power states (e.g., L0, L1, L1.X, L2, etc.) together, although the expectation is that every data item in storage is accessible for compute purposes. In a low power mode (e.g., L1, L1.X, L2, etc.), the storage device is expected to consume power at, or below, a given threshold. As much of the data stored on the device is inaccessible in a low power mode, it is important to avoid unnecessary transfers as these take the storage device out of low power mode in order to accommodate the transfer. Because the storage device is transitioned to a higher power mode to accommodate transfers, power is wasted.

What is needed are systems and methods to address these and other issues.

SUMMARY

The present disclosure generally relates to identifying data that is to be accessible in a low power state of a data storage device, and store this data in a physical (or logical) block that will be accessible in a low power state of the data storage device. Low power accessible data may be identified by host metadata of the data, indicating access is needed in a low power state. In other embodiments, the data storage device may learn the power state in which data should be accessible. In these embodiments, a controller stores information regarding the power state of a namespace in which the data is stored as an indicator to make the data accessible in a low power state. Alternatively, the controller stores a previous power state in which the data was accessed as an indicator to make the data accessible in a low power state.

In one embodiment, a data storage device is disclosed that includes a memory device comprising a plurality of blocks, and a controller coupled to the memory device, the controller being configured to execute a method for data management for low power mode handling. The method includes identifying a block of the plurality of blocks to remain active in a low power state of the data storage device and receiving a first data element. The method further includes classifying the first data element to be accessible in the low power state of the data storage device, and directing at least a portion of the first data element to the block.

In another embodiment, a controller for a data storage device that includes a memory device comprising computer-readable instructions, and a processor coupled to the memory device and configured to execute the computer-readable instructions. The computer-readable instructions cause the processor to classify a plurality of power states of the data storage device, comprising a first power state, a second power state, and a third power state being at a lower power state than the first power state and the second power state, classify a memory device coupled to the controller as being operational in the third power state, and receiving a first data element from a host. The computer-readable instructions further cause the processor to identify the first data element as required to be available in the third power state, and store the first data element in the memory device.

In another embodiment, a data storage device is disclosed that includes a first memory means operational in a first power state, a second memory means operational in a second power state that is different from the first power state, and a controller means coupled to the first memory means and second memory means. The controller means is configured to receive a data element comprising a data element power state, query a learning database indicating a power state in which the data element is used, and responsive to querying the learning database and based on the data element power state, store the data element in one of the first memory means or second memory means.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure is generally related to identifying data that is to be accessible in a low power state of a data storage device and store this data in a physical (or logical) block that will be accessible in a low power state of the data storage device. Low power accessible data may be identified by host metadata of the data, indicating access is needed in a low power state. In other embodiments, the data storage device may learn the power state in which data should be accessible. In these embodiments, a complementary metal-oxide-semiconductor (CMOS)/controller stores information regarding the power state of a namespace in which the data is stored as an indicator to make the data accessible in a low power state. Alternatively, the CMOS/controller stores a previous power state in which the data was accessed as an indicator to make the data accessible in a low power state.

Figure 1:
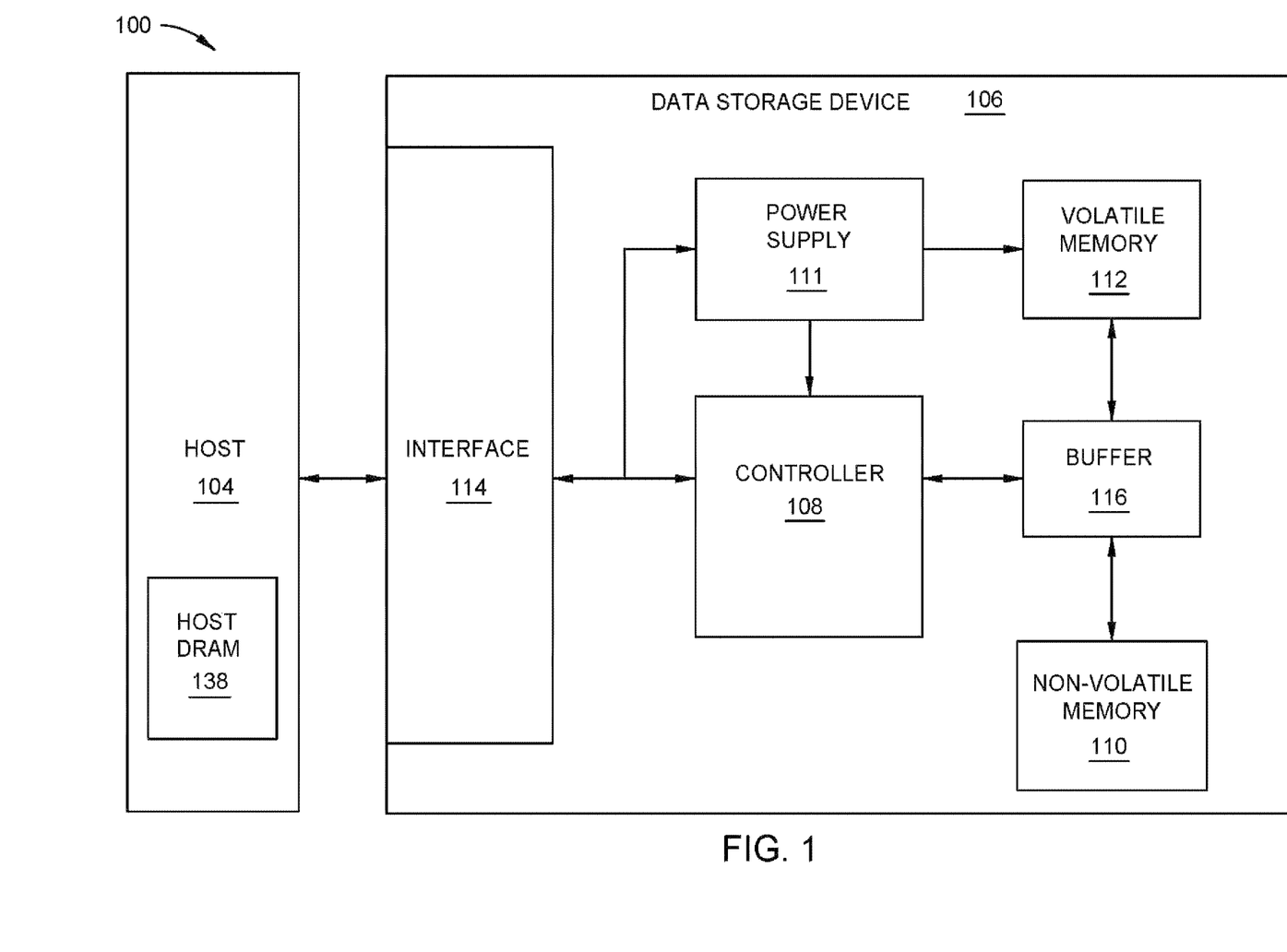
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

The interface 114 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit may receive a message from the controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an on-board backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, the controller 108 may use volatile memory 112 as a cache. For instance, the controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The controller 108 may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
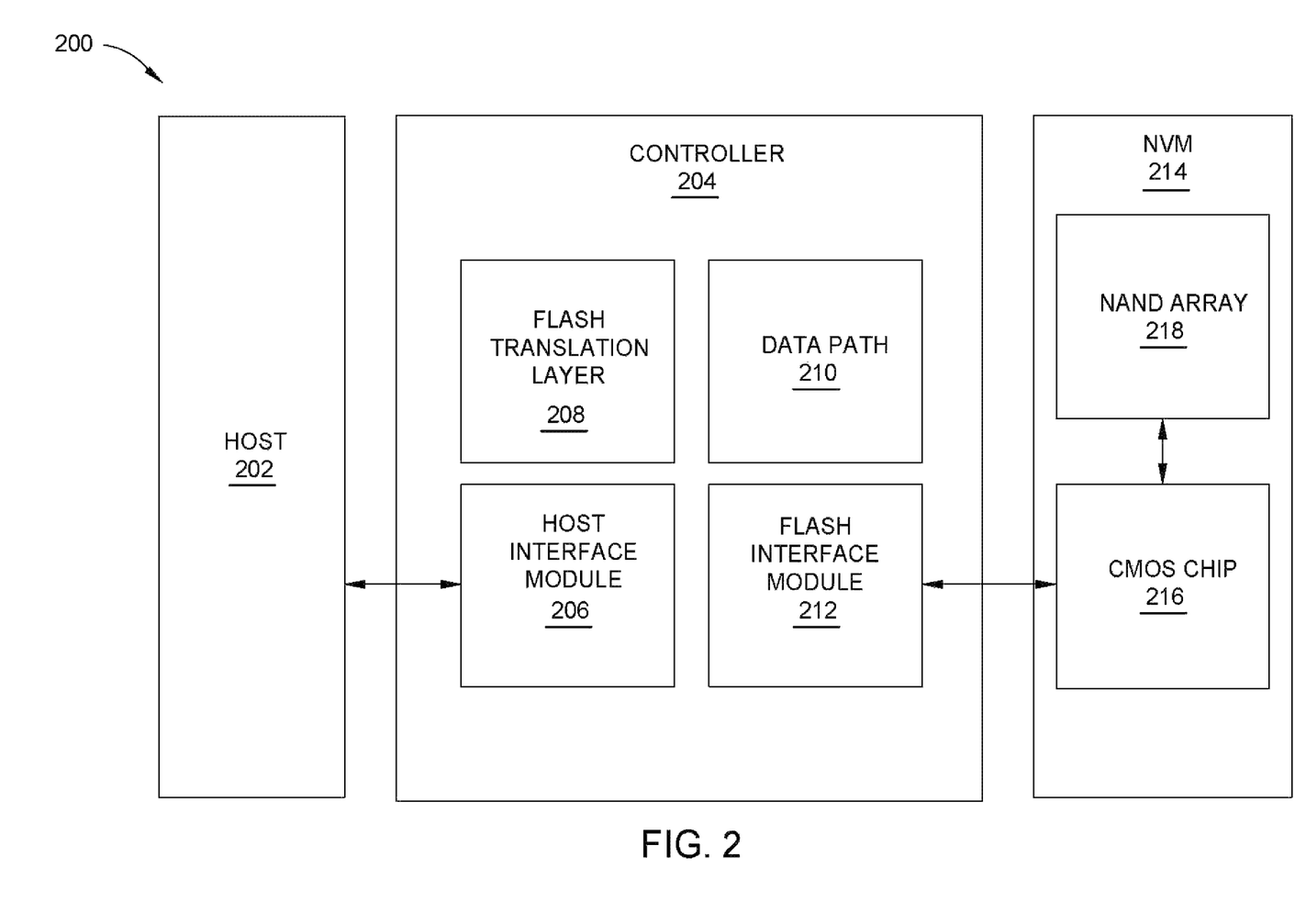
FIG. 2 is a schematic block diagram illustrating a storage system in which a controller is coupled to a host device and an NVM having a CMOS chip coupled to a NAND array, according to certain embodiments.

FIG. 2 is a schematic block diagram illustrating a storage system 200 in which a controller 204 is coupled to a host device 202 and an NVM 214 having a CMOS chip 216 coupled to a NAND array 218, according to certain embodiments. Aspects of the storage system 200 may be similar to the storage system 100 of FIG. 1. For example, the host device 202 may be the host device 104, the controller 204 may be the controller 108, and the NVM 214 may be the NVM 110.

The controller 204 includes a host interface module (HIM) 206, a flash translation layer (FTL) 208, a data path 210, and a flash interface module (FIM) 212. It is to be understood that the depicted components of the controller 204 are for exemplary purposes and the controller 204 may include other components not shown. Furthermore, it is noted that the descriptions of the components herein are not intended to be limiting, but to provide an example of a possible embodiment.

The HIM 206 is configured to communicate with the host device 202.

For example, the HIM 206 may configured to receive data, including host generated commands, from the host device 202 and send requested data associated with the generated host commands to the host device 202. The FTL 208 may be configured to translate a logical block address (LBA) of the received host command to a physical block address (PBA) of the NVM 214. The FTL 208 may determine the mapping based on a logical to physical (L2P) table, where the L2P table includes a mapping of LBAs to PBAs. The data path 210 may include various processing units, such as a parity/exclusive or (XOR) data/low density parity check (LDPC)/error correction code (ECC) generator, an encoder, a decoder, direct memory accesses (DMAs), and the like. The received host command and the data retrieved from the NVM are processed by the components of the data path 210. The flash interface module (FIM) may be configured to communicate between the controller 204 and the NVM 214, such as scheduling read and write commands to the NVM 214 and receiving data from the NVM 214.

The CMOS chip 216 is coupled to the FIM 212, such that the CMOS chip 216 receives data from and sends data to the FIM 212. In some embodiments, the FIM 212 may be coupled to the NAND array 218 or both the NAND array 218 and the CMOS chip 216. Because of the proximity of the CMOS chip 216 to the NAND array 218, the CMOS chip 216 may be able to process data faster than the controller 204 itself. A structure including the CMOS chip 216 coupled to the NAND array 218 may be a CMOS Under Array (CuA) architecture, a CMOS Bounded Array (CbA) architecture, or a CMOS Above Array (CAA) architecture. The CMOS chip 216 may be configured to perform similar logic as the controller 204, such as scheduling read and write commands to the NAND array 218, and include similar components as the controller 204. Furthermore, tasks assigned to the controller 204 may be performed by the respective CMOS chip 216. It is to be understood that the NVM 214 may include a plurality of NAND arrays 218, where each NAND array 218 is coupled to a CMOS chip 216, or a plurality of NAND arrays 18, where one or more NAND arrays 218 are coupled to a CMOS chip 216. Because the CMOS chip 216 is an additional component processing data, the CMOS chip 216 may require additional power than if the NVM 214 did not include the CMOS chip 216.

Figure 3:
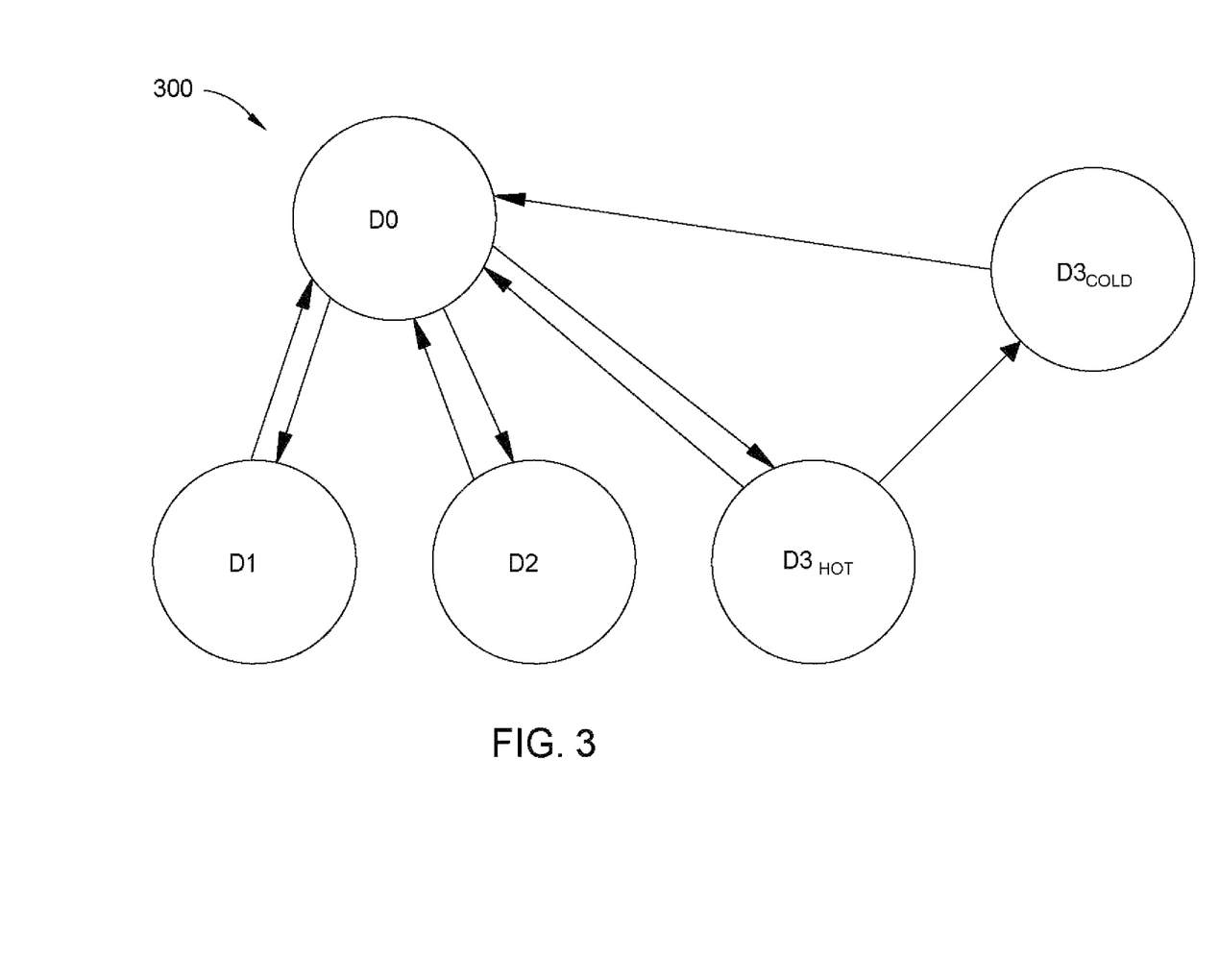
FIG. 3 is a schematic flow diagram of a power state diagram of a data storage device, according to certain embodiments.

FIG. 3 is a schematic flow diagram of a power state diagram 300 of a data storage device, such as the data storage device 106 of FIG. 1, according to certain embodiments. The data storage device 106 operates at various power states, such as D0, D1, D2, D3$_{HOT}$, and D3$_{COLD}$. It is contemplated that other power states, as well as fewer than or greater than the described number of power states, are applicable to the described embodiments. The host, such as the host computer system 102 of FIG. 1, may provide a suitable amount of power to the data storage device 106 through one or more pins on the interface, such as the interface 114 of FIG. 1. It is contemplated that other power state diagrams, such as power state diagrams including LX power states and SX power states, where X refers to a numerical value corresponding to the relevant power state, may be applicable to the embodiments described herein.

The suitable amount of power may be more than or equal to the amount of power the data storage device 106 requires to operate. For example, the power a data storage device 106 may receive from the host computer system 102 may be about 5 W. Furthermore, a data storage device 106 may draw out about 500 mW to about 15 W of power from the host computer system 102. The previously mentioned values for power are not intended to be limiting, but rather provided as a reference.

As mentioned previously, the data storage device 106 may have several power states, such as D0, D1, D2, D3$_{HOT}$, and D3$_{COLD}$. Each of the power states is associated with a distinct data storage device 106 operations. The power states are characterized by the following attributes: power consumption, data storage device context, data storage device driver behavior, restore time, and wake-up capability. Power states are numbered sequentially, where higher numbers represent lower power requirements and corresponding higher exit latencies. Furthermore, each power state has an associated power requirement and an exit latency. As shown in FIG. 2, the data storage device may transition from the D0 to either the D1, the D2, or the D3$_{HOT}$ power states. When the data storage device 106 shuts down, the power state of the data storage device exits from D3$_{HOT}$ and enters D3$_{COLD}$.

The D$_0$ power state is considered a fully operational power state, where the data storage device 106 is fully on and operational. An operational power state refers to the ability of a host computer system 102 to communicate with the data storage device 106 in order to perform input/output (I/O) operations, and the data storage device 106 may generate interrupts. Interrupts are an automatic transfer of firmware execution due to a system timer or a user command. The D0 power state has the highest level of continuous power consumption for the data storage device 106. After a period of idle time (e.g., no I/O operations or the like), the host computer system 102 may instruct the data storage device 106 to enter a low power consumption power state, such as the D1, the D2, and the D3$_{HOT}$ power states.

When the data storage device 106 is no longer in use, the host computer system 102 may instruct the data storage device 106 to enter a non-operational power state D3$_{COLD}$ from the power state D3$_{HOT}$ to limit idle power consumption to a minimal value. In order for I/O commands to occur, the data storage device is woken up from power states D1, D2, D3$_{HOT}$, and D3$_{COLD}$ and placed into power state D0.

Each of the power states may be associated with a PCIe input/output (IO) parameter, a CPU parameter, an internal memory parameter, an external memory parameter, and a flash 10 parameter, where the flash 10 parameter may refer to the data being transferred to and from the NVM, such as the NVM 214 of FIG. 2. The power state to parameter association is depicted, in one non-limiting embodiment, in Table 1 below. Table 1 describes the resulting performance of each parameter per power state. At full power states (i.e., D0, D1, and D2 power states), each parameter may be operating at optimal or close to optimal performance. However, when the power state changes to a lower power state, such as D3$_{HOT}$ or D3$_{COLD}$, the performance of the parameters decreases. Furthermore, at the various power states, data transfer or data processing operations may or may not occur due to the power provided to the parameters.

TABLE 1

|  | PCIe IO | CPU | Internal Memory | External Memory | Flash IO |
| --- | --- | --- | --- | --- | --- |
| PS0 | Full On | Full On | Full On | Full On | Full On |
| PS1 | Full On | Throttling | Throttling | Throttling | Throttling |
| PS2 | Full On | Halt | Retain | Retain | Off |
| PS3 | L1 Standby | Part Off | Retain | Off | Off |
| PS4 | L1.2 Standby | Off | Retain | Off | Off |
| PS5 | L2 | Off | Partially Retain | Off | Off |

Referring to Table 1, PS0 may be the D0 power state, PS1 may be the D1 power state, PS2 may be the D2 power state, PS3 and PS4 may be the D3$_{HOT}$ power state, where PS4 is a sub-state of the D3$_{HOT}$ power state, and PS5 may be the D3$_{COLD}$ power state. The PCIe 10 may refer to the power consumption and processing power of the PCIe. For example, when the PCIe is full on (or in an L0 state), data may be actively being transferred and processed by the PCIe. The PCIe in the L0 state has low latency. However, when the PCIe is in an L1 or L1.X, such as an L1.2, state, the PCIe may be in an idle state but not completely powered off. The PCIe in the L1.X state has higher latency than the latency of the L0 state. When the PCIe is in an L2 state, the PCIe is powered down, where the latency of the L2 state is greater than the latency of the L0 state and the L1.X state.

A low power state mode, such as PS3, PS4, and PS5, is that mode where the data storage device, such as the data storage device 106 of FIG. 1, as a whole, should not consume more power than a defined threshold. In order to avoid consuming power greater than the defined threshold, logic is required to allow certain power critical operations, such as storage operations and computational operations, to operate in an optimal manner while in the lower power mode. In the low power state mode, a subset of resources is powered down, such as the external memory and the flash 10. Regarding the external memory in the low power mode, a controller, such as the controller 204 of FIG. 2, stops the activities across all the dies in an unbiased manner. When in a low power state mode, some tasks, such as urgent tasks and critical compute requirements, may be affected. In a simple token-based power management scheme, each of the CbA dies (or memory dies/NAND arrays with CMOS architecture) may be affected equally.

Figure 4:
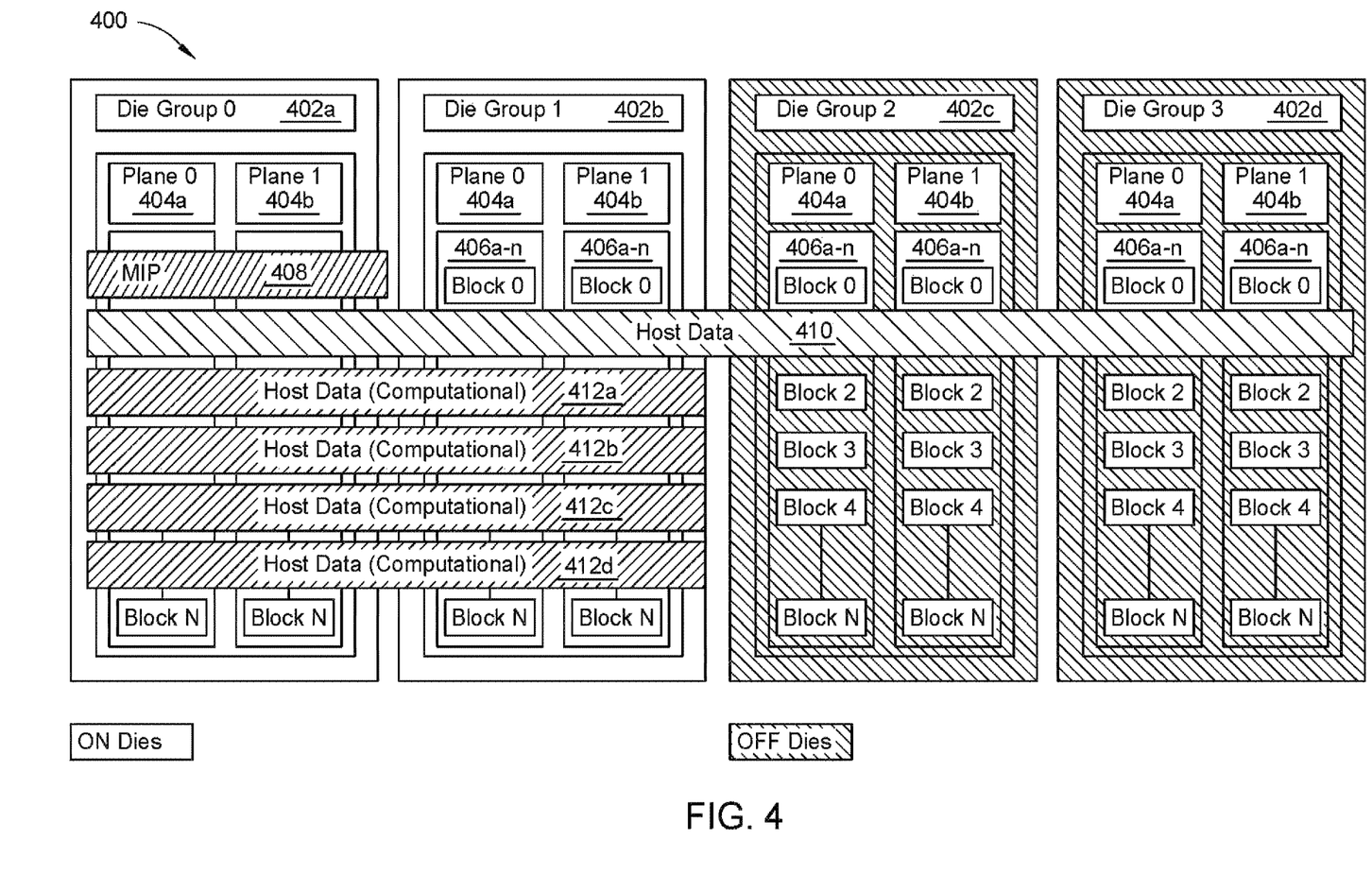
FIG. 4 is a schematic block diagram of a data arrangement in an NVM, according to certain embodiments.

FIG. 4 is a schematic block diagram of a data arrangement 400 in an NVM, such as the NVM 214 of FIG. 2, according to certain embodiments. The data arrangement 400 includes a first die group 0 402a, a second die group 1 402b, a third die group 2 402c, and a fourth die group 3 402d. Each die group of the plurality of die groups 402a-402d includes a first plane 0 404a and a second plane 1 404b. The number of die groups and the number of planes per die group illustrated are not intended to be limiting but to provide an example of a possible embodiment. Furthermore, each die group of the plurality of die groups 402a-402d may be coupled to a CMOS chip, such as the CMOS chip 216 of FIG. 2. In some embodiments, one or more die groups of the plurality of die groups 402a-402d may share a common CMOS chip.

Because the CMOS chip is an additional component including logic, the power consumption and/or requirement of the data storage device with the addition of one or more CMOS chips to the memory device architecture (e.g., to each die group of the plurality of die groups 402a-402d) may be increased. Therefore, the CMOS chip may include logic to configure the respective die group or the one or more die groups of the plurality of die groups 402a-402d in an off state or an on state. The on state refers to the respective die group(s) being powered (e.g., provided electrical power through relevant circuitry), such that data may be programmed to or read from the respective die group(s). Alternatively, the off state refers to the respective die group(s) being powered off, such that data operations, such as read or write operations, are not performed on the respective die group(s). It is contemplated that a controller, such as the controller 108 of FIG. 1, may also configure one or more die groups of the plurality of die groups 402a-402d in either the on state or the off state.

Referring to FIG. 4, the first die group 0 402a and the second die group 1 402b are on, and the third die group 2 402c and the fourth die group 3 402d are off. Master Index Page (MIP) 408 stores control information needed to manage the memory device (e.g., one or more die groups of the plurality of die groups 402a-402d), such as how data is stored on the die group or what data is stored to each die group. It is to be understood that the MIP 408 may be stored across one or more die groups, but not all die groups, such as on both the first die group 0 402a and the second die group 1 402b. Furthermore, the MIP 408 is stored on one or more "on" die groups.

Host data 410 may be stored on each of the plurality of die groups 402a-402d. In some examples, host data 410 includes metadata associated with the host data 410. Furthermore, a plurality computational host data 412a-412d may be stored on one or more die groups, including die groups that are "off," but not all die groups. For example, the plurality of computational host data 412a-412d is stored on the first die group 0 402a and the second die group 1 402b. In another example, the plurality of computational host data 412a-412d is stored on the first die group 0 402a, the second die group 1 402b, and the third die group 2 402c. It is to be understood that the number of computational host data 412a-412d depicted is not intended to be limiting but to provide an example of a possible embodiment. Examples of computational host data include filter coefficients required to calculate convolutional results for a given input. It is contemplated that different die group combinations may be possible for the different power state modes, such as the power states of the power state diagram 300 of FIG. 3.

A decision to enter a low power state for one or more die groups may be a host device, such as the host device 104 of FIG. 1, driven. For example, the host device 104 may divide data into several non-limiting categories, such as critical data, mid-importance data, and low-importance data. Critical data may include data elements needed by a host in all power modes such as system data associated with the host or other application. Mid-importance data may include associated with some power modes, such as howst appliations such as low bit rate media, which may not need full die interleaving performance and data present in some die groups. Low-importance data may include data associated with low priority applications such as games that are not typically triggered in low power modes. The labeling of data (i.e., importance) may be completed by the host device and passed to the data storage device in the metadata of a host command. As described above, each die group of the plurality of die groups 402a-402d may be divided into power categories that indicate which memory die or die group stays operational at each power state of the data storage device. It is contemplated that the one or more die groups appropriate to each of the data importance categories mentioned above may be adjusted or re-provisioned during the lifetime of the data storage device due to wear-leveling equalization techniques. In some examples, overprovisioning may need to be adjusted to keep write amplification in acceptable ranges for the one or more die groups provisioned for critical data.

Critical data may be written to one or more die groups that are supported in a low power state (e.g., the one or more die groups that are powered or in an "on" state, such as the first die group 0 402a and the second die group 402b). An FTL, such as the FTL 208 of FIG. 2, may be configured to relocate critical data strictly to the one or more die groups that are supported in the low power state. Thus, the critical data may be accessed by the controller in the low power state while other die groups are powered off.

The host device may store the critical application data needing compute in a certain power states, but not in a full power state. For example, a gaming host device or a graphics host device may access one or more memory devices in a medium power mode, such as the PS2 power state, for a certain stream in order to avoid drawing power from other streams accessing one or more memory devices. Because the data storage device electrical power is shared among all the components of the data storage device, drawing more power from one memory device may cause a power drop in another memory device.

For example, when the host device utilizes the first die group 0 402a in a PS0 power state, an amount of power is provided for the operation of the first die group 0 402a. However, if the host device also wants to utilize the second die group 1 402b in the PS0 state and the data storage device does not have enough power for both the first die group 0 402a and the second die group 1 402b to be operated in the PS0 power state, the power provided to the first die group 0 402a may be decreased in order to provide the second die group 1 402b power needed to operate the second die group 1 402b in the PS0 power state. The host device may be able to set up the data storage device in different power state modes, and the data storage device may be able to place data in the respective memory devices based on the access requirements of each power state mode.

In another example, the controller of the data storage device may classify the received host data into the different power categories based on historical data accesses. For example, the controller may determine that the compute requests, including the workload of the various CMOS chips, during different power state modes and associate the compute data in the context of power state modes. If data is accessed during a low power state mode, the data may be classified as a low power state mode data and moved during garbage collection or wordline WL operations of the data storage device into the appropriate die group(s) of the plurality of die groups 402a-402d.

The controller may determine to switch off some die groups entirely in some power state modes, which may decrease static wastage and increase the power efficiency of the system. Because one or more die groups of the plurality of die groups 402a-402d may be "off," the controller may include logic, during garbage collection, to place data of the garbage collection in to the appropriate one or more die groups of the plurality of die groups 402a-402d that are "on." For example, the LBAs are mapped to the various power state modes based on the application (e.g., the host device) accesses in the various power modes. For example, if certain regions of the memory device, such as the first die group 0 402a and the second die group 1 402b, are more heavily accessed (i.e., accessed more frequently) in the PS2 power state, the controller may mark or record the relevant LBAs to be associated with the PS2 power state. During a garbage collection operation, the data associated with the PS2 power state may be moved or prioritized to another destination, such as a third die group 2 402c that is associated with the PS2 power state that is "on."

It is contemplated that embodiments described above may be applicable to data storage devices with namespaces, such as NVMe configured data storage devices, where the die groups and namespaces are analogous. Namespaces associated with low power state modes and the normal power state modes may be created and managed internally by the data storage device, such as by the controller. In some examples, the controller may learn from the host device pattern, such as when the host device accesses an NVMe urgent queue, the relevant LBAs may be tagged for storage in the "on" die groups or the one or more die groups that are "on" during a low power state mode in a garbage collection operation or a WL operation.

For example, during the operation of a data storage device, 12 programs are captured at a different point during a normal mode of operation (normal hours), where 3 programs of the 12 programs are captured at non-working hours in one of the lower power storage modes. The data storage device may form jumbo logical blocks across both ON and OFF die groups and use them for high bandwidth streams (12 programs) during regular hours. On the other hand, the data storage device may use the logical blocks formed from ON groups alone while putting the OFF groups in a sleep state during lower power modes for low bandwidth streams (3 programs). Thus, the consolidated transport stream with only 3 programs may utilize less bandwidth than that of the 12 programs. While the performance may not be affected with lower block interleaving (with only ON groups), the power saved by only utilizing the ON die groups rather than both ON and OFF die groups may be beneficial. Likewise, multiple ON and OFF groups may be formed for multiple NVMe power modes in the context of storage as well as compute.

In another example, the program streams or video streams required for playback in lower power modes may be maintained in the ON groups and may be decided by the controller based on the application, such as data analysis during non-peak hours. The program streams or video streams may also be maintained for playback during normal power mode (or streams wherever there is no heads up information) may be stored based on a default design.

In another embodiment, different applications may be biased during low power mode. For example, some applications may be allowed to have a lower performance during a low power state mode. Some other applications, deemed critical, may be allowed to run compute with 'regular performance' even during one of the low power state modes by routing their data into specific die groups. The die groups and the CMOS chip is kept "on." Likewise, applications may be ranked to determine their biased share of resources in the data storage device during low power modes. The ranking may be host device assisted or data storage device determined. The ON die groups may be on during low power mode. The power management of the data storage device may be simplified, and a token may be provided to OFF die groups on a need basis. The token may refer to an indication referring to the data being accessible in a low power state.

Different CMOS chips may include different sets of resources. Thus, each CMOS chip may have different power consumption during operation. The controller may accommodate the max power rating while allocating ON die groups and OFF die groups for the different low power state modes.

Furthermore, the data storage device may issue first in first out (FIFO) based tokens based on the application. For example, a first application needing a token may not be provided a token in order to save the token for an application that requires the token. Thus, applications may receive better performance during low power state modes, such as in PS2 or PS3. Thus, the quality of service in a low power state mode may be improved.

The ON die groups and the OFF die groups may also be decided based on the current ratings of the memory dies, which may be based on the amount of resources in the logic of the CMOS chip. The logic may be biased to use die groups with lower CMOS chip resources for ON groups based on the computation load during lower power state modes.

Figure 5:
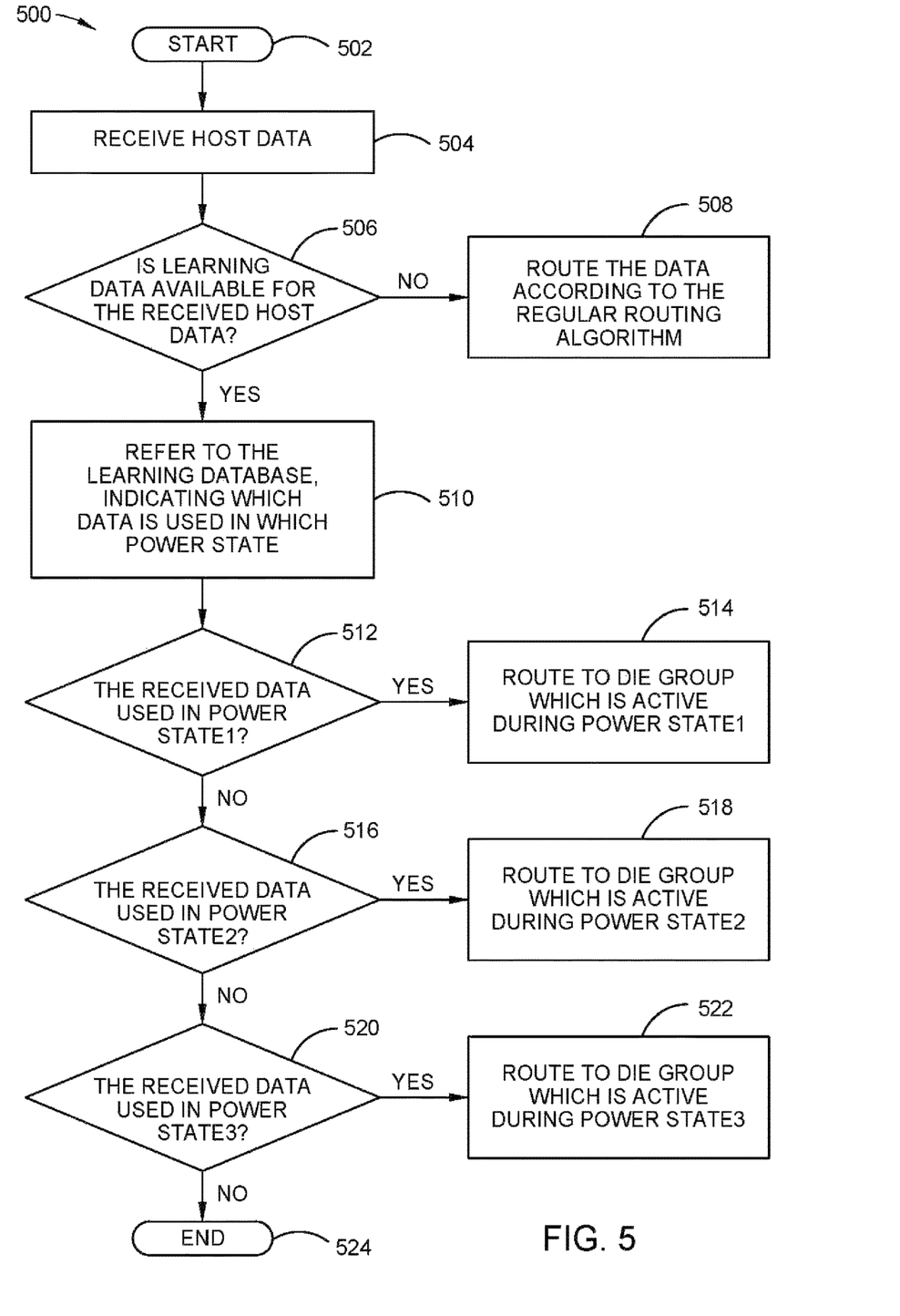
FIG. 5 is a flow diagram illustrating a method of routing host data based on host device provided metadata, according to certain embodiments.

FIG. 5 is a flow diagram illustrating a method 500 of routing host data based on host device provided metadata, according to certain embodiments. Method 500 may be implemented by the controller 204 and/or the CMOS chip 216 of FIG. 2 as an exemplary embodiment. References to the controller may alternatively be to the CMOS chip. At block 502, method 500 begins. At block 504, a data storage device, such as the data storage device 106 of FIG. 1, receives host data from a host device, such as the host device 104 of FIG. 1. At block 506, the controller determines if learning data is available for the received host data. Learning data may refer to the data that logic utilizes to determine the associated power state of the received host data. The learning data may be located in the metadata of the received host data.

If the learning data is not available at block 506, then at block 508, the data is routed to the relevant memory device according to the regular routing algorithm (e.g., using an LBA to PBA mapping to determine where the data should be programmed). However, if the learning data is available at block 506, then at block 510, the controller may refer to a learning database, which indicated which data is used in which power state. For example, if the received host data is associated with a commonly or frequently used data type, the received host data may be routed to a fully operational power state, such as PS0. The learning database includes information such as a die group or a namespace to which the received host had been assigned previously, classification data classifying the data element as having been accessible in a certain power state, and power states of previously accessed host data.

At block 512, the controller determines if the received host data is used in PS1. If the received host data is used in PS1 at block 512, then the received host data is routed to the relevant die group, such as the first die group 0 402a of FIG. 4, which is active during PS1 at block 514. However, if the received host data is not used in PS1 at block 512, then the controller determines if the received host data is used in PS2 at block 516.

If the received host data is used in PS2 at block 516, then the received host data is routed to the relevant die group, such as the second die group 1 402b of FIG. 4, which is active during PS2 at block 518. However, if the received host data is not used in PS2 at block 516, then the controller determines if the received host data is used in PS3 at block 520.

If the received host data is used in PS3 at block 520, then the received host data is routed to the relevant die group, such as the third die group 2 402c of FIG. 4, which is active during PS3 at block 522. It is to be understood that the previously listed steps (e.g., determining if the received host data is used in a certain power state, routing the received host data to the relevant die groups in that certain power state, and iterating to the next power state) may repeat until all the power states are iterated through, such that the embodiments described are not limited to PS1, PS2, and PS3. At block 524, method 500 ends.

Figure 6:
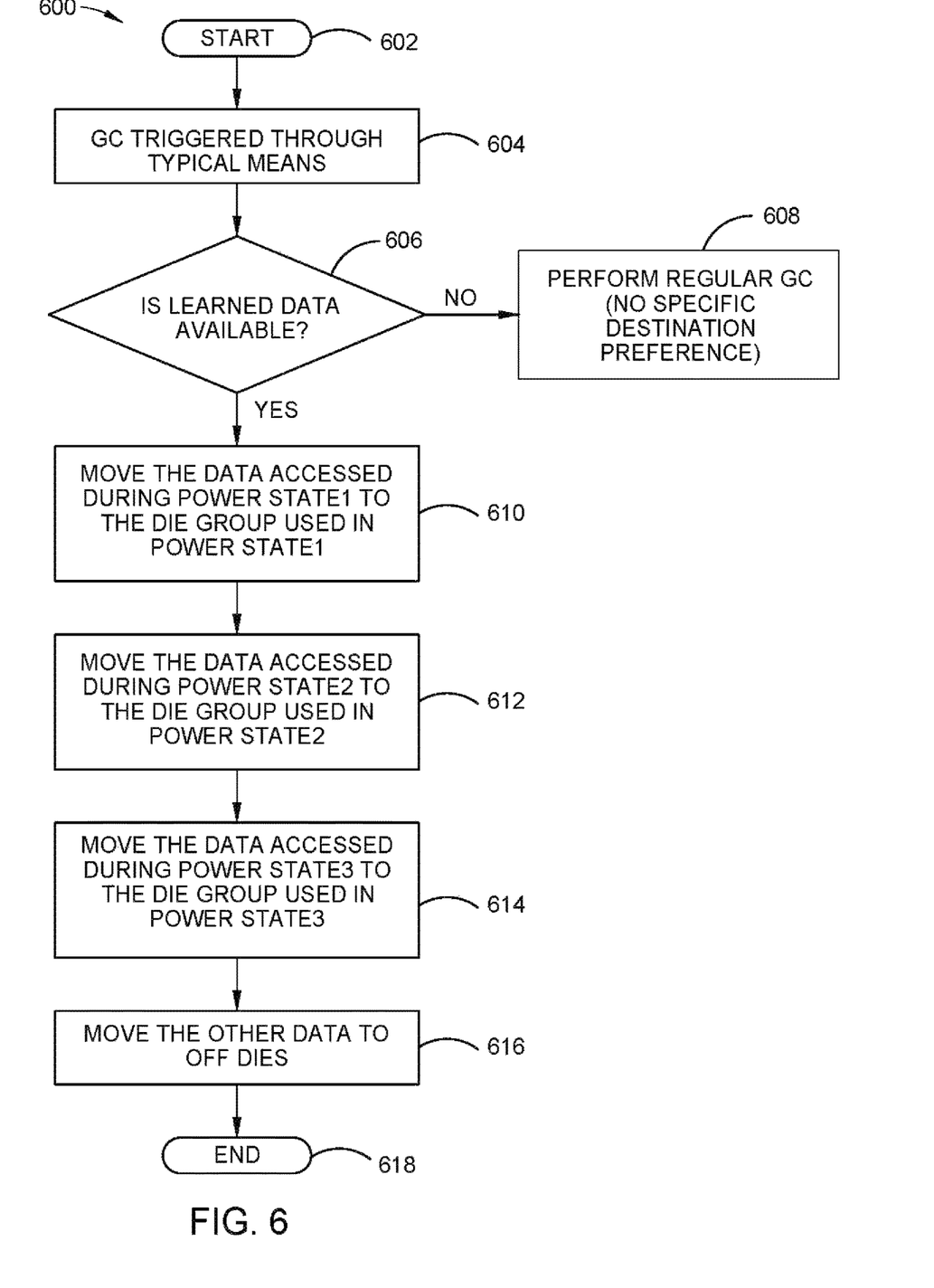
FIG. 6 is a flow diagram illustrating a method of routing host data based on logical data to power state association learning, according to certain embodiments.

FIG. 6 is a flow diagram illustrating a method 600 of routing host data based on logical data to power state association learning, according to certain embodiments. Method 600 may be implemented by controller 204 and/or the CMOS chip 216 of FIG. 2 as an exemplary embodiment. References to the controller may alternatively be to the CMOS chip. At block 602, method 600 begins. At block 604, garbage collection (GC) is triggered through typical means, such as a number of program operations, a time elapsed, a closing of a block or namespace, and the like. At block 606, the controller determines if learned data is available, such as learned data stored in a learning database of the method 500 above. If the learned data is not available at block 606, then regular garbage collection occurs at block 608, where the data is programmed to an appropriate location with no specific destination preference.

However, if there is learned data available at block 606, then at block 610, the data accessed during PS1 is moved to the die group associated with PS1. At block 612, the data accessed during PS2 is moved to the die group associated with PS2. At block 614, the data accessed during PS3 is moved to the die group associated with PS3. At block 616, the other data is moved to the OFF dies. At block 618, method 600 ends.

Method 600 may also be applicable for internal data structures used in regular housekeeping of the data storage device, such as in a master table or the FTL table. For example, the controller may write the MIP data differently in a logical format fitting into the ON die group and power OFF other die groups. Thus, increasing the efficiency of the low power state. Storage specific critical data, such as master table information and L2P data (especially new or updated data), may be flushed specifically to one or more relevant dies. Thus, rather than full interleaving, dies that are unused or not needed may be moved to a deep power down state, such as PS5.

Figure 7:
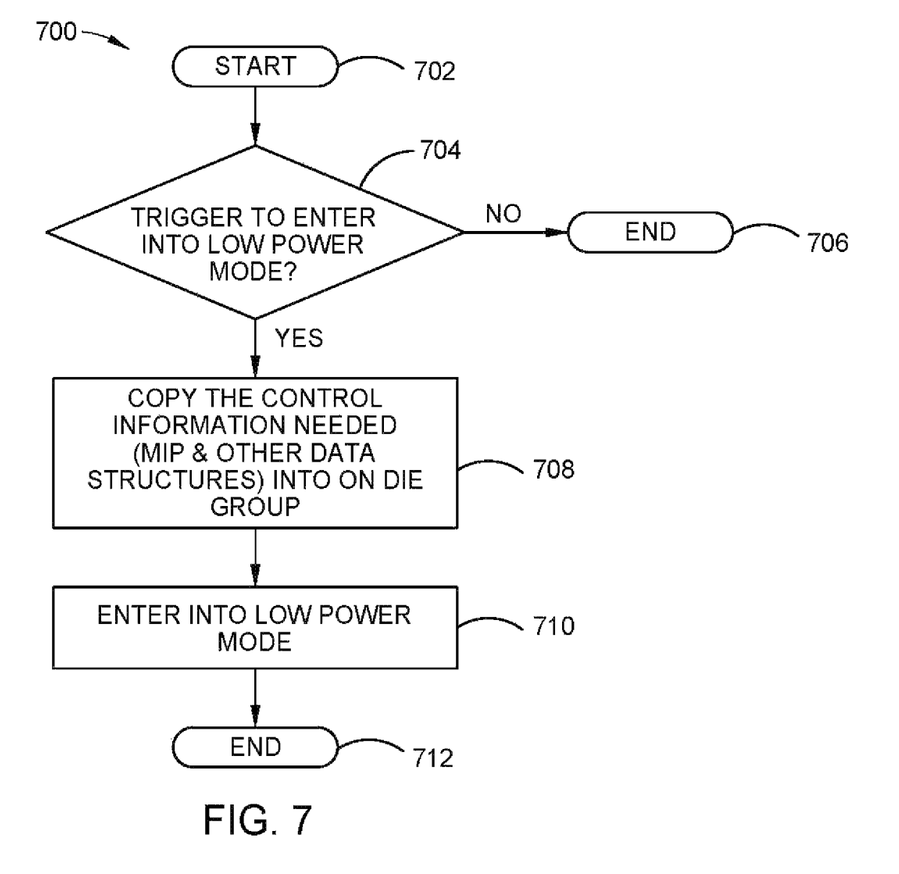
FIG. 7 is a flow diagram illustrating a method of moving data during a garbage collection operation, according to certain embodiments.

FIG. 7 is a flow diagram illustrating a method 700 of moving data during a garbage collection operation, according to certain embodiments. Method 700 may be implemented by controller 204 and/or the CMOS chip 216 of FIG. 2 as an exemplary embodiment. References to the controller may alternatively be to the CMOS chip. At block 702, method 700 starts. At block 704, the controller determines if a trigger to enter low power mode is received. The low power mode trigger may be an indication or a command received from a host device, such as the host device 104, to enter a low power state, such as PS5. If the trigger is not received at block 704, method 700 ends. However, if the trigger is received at block 704, the controller copies the necessary control information at 708, such as MIP data and other data structures, into the ON die groups. At block 710, the data storage device enters a low power mode. At block 712, method 700 ends.

Certain device specific control data structures, such as MIP, which may have a size of a few KBs, may be stored in ON die groups before entering low power mode. Rather than storing the control data structures in any die group, the MIP table, which is central to any data management by the data storage device, is made available to the controller during all the power states as the data is stored on the ON dies.

In one example, a decision to enter a low power state for one or more die groups may be data storage device determined, such as by the controller 108 of FIG. 1. For example, in certain thermal conditions, where the thermal conditions are not favorable for the data storage device, the data storage device may only utilize the one or more die groups in the "on" state (e.g., the first die group 0 402a and the second die group 1 402b) and manage the data structures within the selected die groups.

Figure 8:
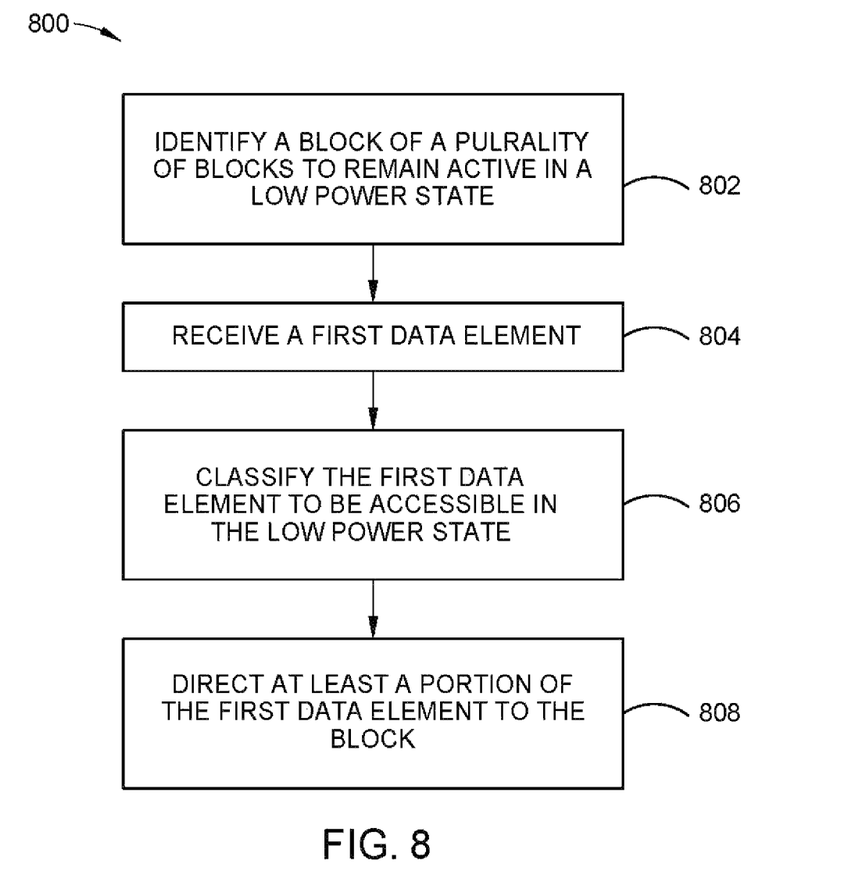
FIG. 8 is a flow diagram illustrating a method of low power mode handling, according to certain embodiments.

FIG. 8 is a flow diagram illustrating a method 800 of low power mode handling, according to certain embodiments. Method 800 may be implemented by controller 204 and/or the CMOS chip 216 of FIG. 2 as an exemplary embodiment. References to the controller may alternatively be to the CMOS chip. At block 802, the controller identifies a block of a plurality of blocks to remain active in a low power state. For example, the identified block, which may be one or more blocks, may be the first die group 0 402a of FIG. 4. At block 804, a first data element is received from a host device, such as the host device 104 of FIG. 1. At block 806, the first data element is classified to be accessible in the low power state. For example, by utilizing the learned data of the first data element and comparing the learned data to entries of a learning database, the controller may determine whether the first data element is to be accessible in the low power state. At block 808, at least a portion of the first data element is directed to the identified block to be stored.

By performing classification and programming data based on criteria, the computational and data storage operations may be more efficiently performed in a low power state mode.

In one embodiment, a data storage device is disclosed that includes a memory device comprising a plurality of blocks, and a controller coupled to the memory device, the controller is configured to execute a method for data management for low power mode handling. The method includes identifying a block of the plurality of blocks to remain active in a low power state of the data storage device and receiving a first data element. The method further includes classifying the first data element to be accessible in the low power state of the data storage device and directing at least a portion of the first data element to the block.

Classifying the first data element to be accessible in a low power state includes parsing metadata of the first data element. The metadata identifies the first data element as being accessible in the low power state. Classifying the first data element to be accessible in a low power state includes identifying a previous power state in which the first data element was accessed. The previous power state in which the first data element was accessed was the low power state. Classifying the first data element includes identifying a logical namespace in which the first data element had been stored. The identifying the logical namespace as being accessible in the low power state. A flash translation layer (FTL) directs the portion of the first data element to the block.

In another embodiment, a controller for a data storage device that includes a memory device comprising computer-readable instructions and a processor coupled to the memory device and configured to execute the computer-readable instructions. The computer-readable instructions cause the processor to classify a plurality of power states of the data storage device, comprising a first power state, a second power state, and a third power state being at a lower power state than the first power state and the second power state, classify a memory device coupled to the controller as being operational in the third power state, and receiving a first data element from a host. The computer-readable instructions further cause the processor to identify the first data element as required to be available in the third power state and store the first data element in the memory device.

The computer-readable instructions to identify the data element further cause the controller to identify a logical namespace in which the first data element had been stored previously. The logical namespace had been designated as being accessible in the third power state. The computer-readable instructions to identify the data element further cause the controller to identify a previous power state in which the first data element was accessible. The previous power state was the third power state. The computer-readable instructions to identify the data element further cause the controller to parse metadata of the first element. The metadata identifies the first data element as being accessible in the third power state. The further includes computer-readable instructions that cause the controller to receive a second data element identified as being accessible in one of the first power state and second power state and storing the second data element in a second memory device.

In another embodiment, a data storage device is disclosed that includes a first memory means operational in a first power state, a second memory means operational in a second power state that is different from the first power state, and a controller means coupled to the first memory means and second memory means. The controller means is configured to receive a data element comprising a data element power state, query a learning database indicating a power state in which the data element is used, and responsive to querying the learning database and based on the data element power state, store the data element in one of the first memory means or second memory means.

The learning database comprises a namespace to which the data element had been assigned in previously. The namespace had been accessible in one of the first power state or second power state. The learning database comprises classification data classifying the data element as having been accessible in one of the first power state or second power state. The data element comprises metadata indicating the data element is accessible in one of the first power state and second power state. The metadata is set by a host.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device comprising a plurality of blocks; and
a controller coupled to the memory device, the controller being configured to execute a method for data management for low power mode handling, the method comprising:
identifying a block of the plurality of blocks to remain active in a low power state of the data storage device;
receiving a first data element;
classifying the first data element to be accessible in the low power state of the data storage device; and
storing at least a portion of the first data element to the identified block, wherein classifying the first data element to be accessible in a low power state comprises identifying a previous power state in which the first data element was accessed.

2. The data storage device of claim 1, wherein classifying the first data element to be accessible in a low power state comprises parsing metadata of the first data element, the metadata identifying the first data element as being accessible in the low power state.

3. The data storage device of claim 1, wherein the previous power state in which the first data element was accessed was the low power state.

4. The data storage device of claim 1, wherein classifying the first data element comprises identifying a logical namespace in which the first data element had been stored.

5. The data storage device of claim 4, identifying the logical namespace as being accessible in the low power state.

6. A data storage device, comprising:
a memory device comprising a plurality of blocks; and
a controller coupled to the memory device, the controller being configured to execute a method for data management for low power mode handling, the method comprising:
identifying a block of the plurality of blocks to remain active in a low power state of the data storage device;
receiving a first data element;
classifying the first data element to be accessible in the low power state of the data storage device; and
storing at least a portion of the first data element to the identified block, wherein a flash translation layer (FTL) directs the portion of the first data element to the identified block.

7. A controller for a data storage device, comprising:
a memory device comprising firmware instructions; and
a processor coupled to the memory device and configured to execute the firmware instructions that cause the processor to:
classify a plurality of power states of the data storage device, comprising a first power state, a second power state, and a third power state being at a lower power state than the first power state and the second power state;
classify at least a portion of a second memory device coupled to the controller as being operational in the third power state;
receiving a first data element from a host;
identify the first data element as required to be available in the third power state; and store the first data element in the portion of the second memory device classified as being operational in the third power state.

8. The controller of claim 7, wherein the firmware instructions to identify the data element further cause the controller to identify a logical namespace in which the first data element had been stored previously.

9. The controller of claim 8, wherein the logical namespace had been designated as being accessible in the third power state.

10. The controller of claim 7, wherein the firmware instructions to identify the data element further cause the controller to identify a previous power state in which the first data element was accessible.

11. The controller of claim 10, wherein the previous power state was the third power state.

12. The controller of claim 7, wherein the firmware instructions to identify the data element further cause the controller to parse metadata of the first element, the metadata identifying the first data element as being accessible in the third power state.

13. The controller of claim 7, further comprising additional processor-readable instructions that cause the controller to receive a second data element identified as being accessible in one of the first power state and second power state, and storing the second data element in a third memory device.

14. A data storage device, comprising:
a first memory means operational in a first power state;
a second memory means operational in a second power state that is different from the first power state; and
a controller means coupled to the first memory means and the second memory means, the controller means configured to:
receive a data element comprising a data element power state;
query a learning database indicating a power state in which the data element is used; and
responsive to querying the learning database and based on the data element power state, store the data element in one of the first memory means or second memory means.

15. The data storage device of claim 14, wherein the learning database comprises a namespace to which the data element had been assigned in previously.

16. The data storage device of claim 15, wherein the namespace had been accessible in one of the first power state or the second power state.

17. The data storage device of claim 14, wherein the learning database comprises classification data classifying the data element as having been accessible in one of the first power state or the second power state.

18. The data storage device of claim 14, wherein the data element comprises metadata indicating the data element is accessible in one of the first power state and the second power state.

19. The data storage device of claim 18, wherein the metadata is set by a host.

* * * * *